(12) United States Patent
San Vicente et al.

(10) Patent No.: US 10,503,759 B2
(45) Date of Patent: Dec. 10, 2019

(54) SYSTEM AND METHOD FOR PROVIDING MEDIA IDENTIFIERS ASSOCIATED WITH ENTERPRISE MESSAGES

(71) Applicant: Verizon Patent and Licensing Inc., Arlington, VA (US)

(72) Inventors: Melissa San Vicente, Pleasant Hill, CA (US); Mahendra Tharshanan, San Ramon, CA (US); Lodema M. Steinbach, Clayton, CA (US); Radhika Khanna, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 274 days.

(21) Appl. No.: 15/485,878

(22) Filed: Apr. 12, 2017

(65) Prior Publication Data
US 2018/0300391 A1 Oct. 18, 2018

(51) Int. Cl.
*G06F 16/28* (2019.01)
*G06F 16/23* (2019.01)
*H04L 12/58* (2006.01)

(52) U.S. Cl.
CPC ............ *G06F 16/288* (2019.01); *G06F 16/23* (2019.01); *H04L 51/28* (2013.01)

(58) Field of Classification Search
None
See application file for complete search history.

(56) References Cited

U.S. PATENT DOCUMENTS

| | | | |
|---|---|---|---|
| 7,873,376 B2 | 1/2011 | Coelho | |
| 8,694,032 B1 | 4/2014 | Kilpatrick et al. | |
| 9,622,051 B2 * | 4/2017 | Prabhune | H04W 4/12 |
| 2003/0084103 A1 | 5/2003 | Weiner et al. | |
| 2004/0203619 A1 | 10/2004 | Tissot | |
| 2005/0070314 A1 | 3/2005 | Wilson | |
| 2006/0135213 A1 | 6/2006 | Jiang | |
| 2006/0271630 A1 | 11/2006 | Bensky et al. | |
| 2006/0281447 A1 | 12/2006 | Lewis et al. | |
| 2007/0073767 A1 | 3/2007 | Springer et al. | |
| 2007/0266090 A1 | 11/2007 | Len | |
| 2008/0132254 A1 | 6/2008 | Graham et al. | |
| 2008/0244091 A1 * | 10/2008 | Moore | G06Q 10/10 709/246 |
| 2008/0244418 A1 * | 10/2008 | Manolescu | G06Q 10/00 715/753 |

(Continued)

FOREIGN PATENT DOCUMENTS

EP 1601212 11/2005

OTHER PUBLICATIONS

Co-pending U.S. Appl. No. 15/439,356, by Rohini Prabhune et al., entitled "Identifiers For Enterprise Message", filed Feb. 22, 2017, 33 pages.

*Primary Examiner* — Thu N Nguyen

(57) ABSTRACT

A device may receive mapping information that maps an enterprise identifier to a first media identifier, and store the mapping information to allow a set of applications of the device to access the mapping information. The device may obtain updated mapping information based on an update condition being satisfied, and store the updated mapping information. The device may provide, for display via a user interface of an application of the device, a second media identifier in association with a communication.

20 Claims, 12 Drawing Sheets

(56) References Cited

U.S. PATENT DOCUMENTS

| | | |
|---|---|---|
| 2008/0304631 A1* | 12/2008 | Vilis .................. H04M 3/42 379/45 |
| 2009/0097631 A1 | 4/2009 | Gisby et al. |
| 2010/0042688 A1 | 2/2010 | Maghraby |
| 2010/0066508 A1 | 3/2010 | Jokinen et al. |
| 2010/0151891 A1 | 6/2010 | Coelho |
| 2010/0192068 A1 | 7/2010 | Wineinger et al. |
| 2012/0100839 A1 | 4/2012 | Christensen |
| 2013/0006627 A1 | 1/2013 | Guthery et al. |
| 2013/0159431 A1 | 6/2013 | Berry et al. |
| 2015/0134448 A1 | 5/2015 | Tung et al. |
| 2016/0171209 A1 | 6/2016 | Perez et al. |
| 2017/0006439 A1 | 1/2017 | Prabhune et al. |

\* cited by examiner

SYSTEM AND METHOD FOR PROVIDING MEDIA IDENTIFIERS ASSOCIATED WITH ENTERPRISE MESSAGES

BACKGROUND

An enterprise customer of a wireless service provider may utilize a messaging application server to send a message to an individual customer of the wireless service provider. For example, a bank may send an account access verification message to a user device via a network of the wireless service provider. The enterprise customer may be provided with an enterprise identifier (e.g., a numeric code, such as a short code, a long code, or the like) with which to send and/or receive messages.

DETAILED DESCRIPTION OF PREFERRED EMBODIMENTS

The following detailed description of example implementations refers to the accompanying drawings. The same reference numbers in different drawings may identify the same or similar elements.

A user device, such as a smart phone, may receive an enterprise message and provide, for display via a user interface, a media identifier with the enterprise message based on mapping information. Some implementations described herein enable a user device to obtain real-time mapping information updates, enable multiple applications of the user device to utilize the mapping information, and enable the user device to consolidate enterprise messages into a single message thread.

Figure 1:
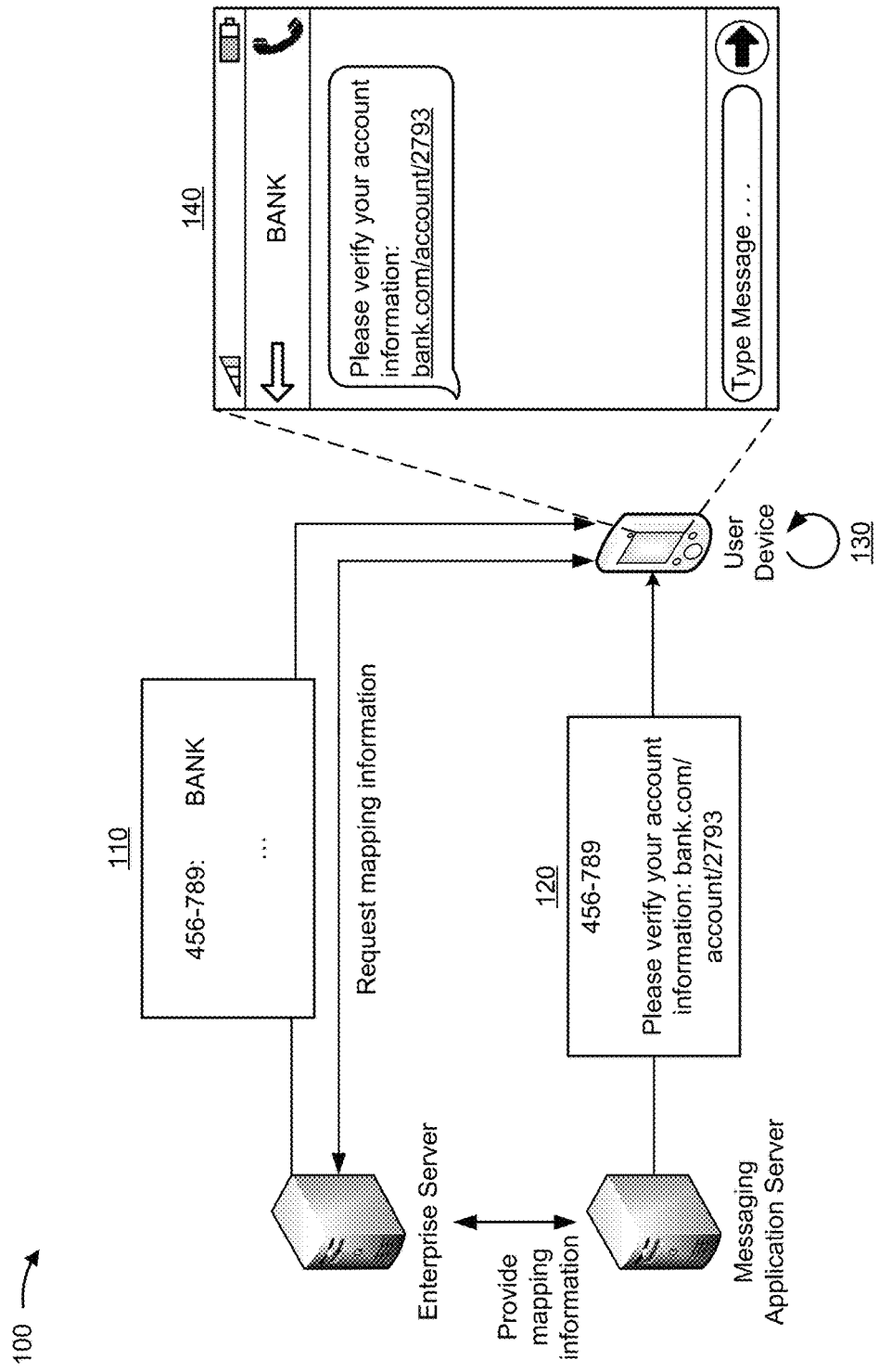
FIG. 1 is a diagram of an overview of an example implementation described herein.

FIG. 1 is a diagram of an overview of an example implementation 100 described herein. As shown in FIG. 1, and by reference number 110, a user device may receive, from an enterprise server, mapping information associated with mapping a set of enterprise identifiers to a set of media identifiers.

In some implementations, a messaging application server may provide enterprise messages to user devices (e.g., short message service (SMS) messages, multimedia message service (MMS) messages, or the like). For example, an enterprise (e.g., an organization, a business, a company, a group, or the like) may utilize a messaging application server to provide enterprise messages to user devices. In some implementations, the enterprise messages may be associated with enterprise identifiers, such as short codes, long codes, telephone numbers, or the like. For example, a wireless service provider may assign one or more enterprise identifiers to an enterprise, which enables the enterprise to send and/or receive messages, calls, etc. via the enterprise identifiers.

In some implementations, a media identifier may include information such as a logo, an avatar, an icon, an image, a video, a sound, or the like. In some implementations, mapping information may include information that maps an enterprise identifier to a media identifier. For example, as shown, the user device may receive mapping information that maps an enterprise identifier (i.e., a short code shown as "456-789") to a media identifier (i.e., an icon shown as "BANK"). In some implementations, the messaging application server may provide, to the enterprise server, information associated with the media identifier.

In some implementations, the user device may receive the mapping information based on downloading and/or installing a messaging application (e.g., a messaging application for receiving enterprise messages, non-enterprise messages, a combination of enterprise messages and non-enterprise messages, or the like). Additionally, or alternatively, the user device may provide, to the enterprise server, application programming interface (API) calls, and receive the mapping information based on the API calls. In some implementations, the user device may store the mapping information in a data structure (e.g., a data structure that is local to the user device, a data structure that is external to the user device or the like).

As further shown in FIG. 1, and by reference number 120, the user device may receive an enterprise message that is associated with an enterprise identifier of the set of enterprise identifiers. For example, as shown, the messaging application server may provide, to the user device, an enterprise message (i.e., a message requesting account verification information) that is associated with an enterprise identifier (i.e., the short code "456-789").

As further shown in FIG. 1, and by reference number 130, the user device may map the enterprise identifier to a particular media identifier, of the set of media identifiers, based on the mapping information. For example, the user device may obtain the mapping information from a data structure for utilization in mapping the enterprise identifier to the media identifier, and map the enterprise identifier to the media identifier based on the mapping information.

As further shown in FIG. 1, and by reference number 140, the user device may provide, for display via a user interface, the particular media identifier with the enterprise message based on mapping the enterprise identifier to the media identifier. In some implementations, the user device may obtain the media identifier (e.g., from a data structure, from the enterprise server, or the like). Additionally, or alternatively, the user device may provide, for display via a user interface, the media identifier with the enterprise message. For example, as shown, the user device may provide, for display via a user interface, the media identifier (i.e., the icon shown as "BANK") with the enterprise message.

In this way, the user device may provide, for display via a user interface, information that facilitates identification of a sender of an enterprise message. This may lead to the user being more inclined to trust the source of the message as originating from the enterprise itself and not from an imposter. For example, a user of the user device may be able to more quickly and accurately discern that the enterprise message is associated with the enterprise based on the media identifier being provided for display in addition to, or in lieu of, the enterprise identifier being provided for display.

Implementations described herein permit the user device to reduce a likelihood of a successful phishing attempt by reducing a likelihood that a user misidentifies a non-genuine enterprise message as being genuine. For example, the mapping information may be third-party verified. For example, when a user device (e.g., a first party) is associated with receiving, from a messaging application server (e.g., a second party), an enterprise message with an enterprise identifier, an enterprise server (e.g., a third party) may verify that the enterprise identifier corresponds to a media identifier intended to identify an operator of the messaging application server.

Additionally, implementations described herein reduce resource consumption and/or network usage associated with the user device based on providing information that identifies the sender of the enterprise message, which reduces a need of the user to cause the user device to perform a search for information that identifies the sender. Additionally, implementations described herein improve security by reducing the likelihood of successful phishing attempts and by providing verified message capabilities. Additionally, implementations described herein reduce resource consumption by providing automatic updates as compared to requiring the user device to periodically fetch updates, or the like.

As indicated above, FIG. 1 is provided merely as an example. Other examples are possible and may differ from what was described with regard to FIG. 1.

Figure 2:
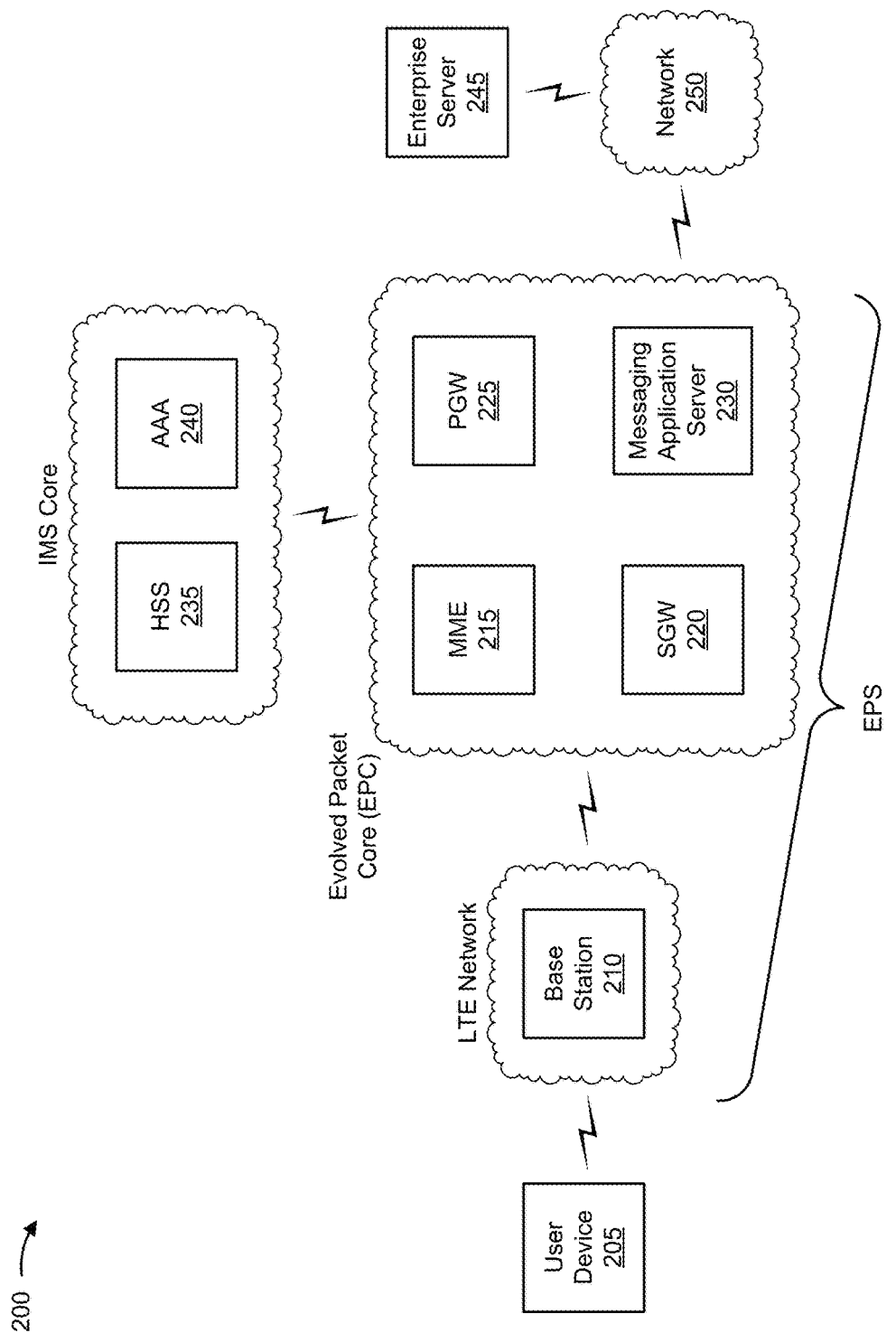
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205, a base station 210, a mobility management entity device (MME) 215, a serving gateway (SGW) 220, a packet data network gateway (PGW) 225, a messaging application server 230, a home subscriber server (HSS) 235, an authentication, authorization, and accounting server (AAA) 240, an enterprise server 245, and a network 250. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a fifth generation (5G) network, a third generation (3G) network, or other advanced networks.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which user device 205 communicates with the EPC. The EPC may include MME 215, SGW 220, and/or PGW 225, and enterprise server 245 that enable user device 205 to communicate with network 250 and/or an Internet protocol (IP) multimedia subsystem (IMS) core. The IMS core may include HSS 235 and/or AAA 240, and may manage device registration and authentication, session initiation, etc., associated with user devices 205. HSS 235 and/or AAA 240 may reside in the EPC and/or the IMS core.

User device 205 includes one or more devices capable of communicating with base station 210 and/or a network (e.g., network 250). For example, user device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. User device 205 may send traffic to and/or receive traffic from network 250 (e.g., via base station 210, SGW 220, PGW 225, and/or enterprise server 245).

Base station 210 includes one or more devices capable of transferring traffic, such as audio, video, text, and/or other traffic, destined for and/or received from user device 205. In some implementations, base station 210 may include an eNB associated with the LTE network that receives traffic from and/or sends traffic to network 250 via SGW 220 and/or PGW 225. Additionally, or alternatively, one or more base stations 210 may be associated with a RAN that is not associated with the LTE network. Base station 210 may send traffic to and/or receive traffic from user device 205 via an air interface. In some implementations, base station 210 may include a small cell base station, such as a base station of a microcell, a picocell, and/or a femtocell.

MME 215 includes one or more devices, such as one or more server devices, capable of managing authentication, activation, deactivation, and/or mobility functions associated with user device 205. In some implementations, MME 215 may perform operations relating to authentication of user device 205. Additionally, or alternatively, MME 215 may facilitate the selection of a particular SGW 220, a particular PGW 225 and/or a particular enterprise server 245 to serve traffic to and/or from user device 205. MME 215 may perform operations associated with handing off user device 205 from a first base station 210 to a second base station 210 when user device 205 is transitioning from a first cell associated with the first base station 210 to a second cell associated with the second base station 210. Additionally, or alternatively, MME 215 may select another MME (not pictured), to which user device 205 should be handed off (e.g., when user device 205 moves out of range of MME 215).

SGW 220 includes one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 250 (e.g., via PGW 225) and/or other network devices associated with the EPC and/or the IMS core. SGW 220 may also receive traffic from network 250 and/or other network devices, and may send the received traffic to user device 205 via base station 210. Additionally, or alternatively, SGW 220 may perform operations associated with handing off user device 205 to and/or from an LTE network.

PGW 225 includes one or more devices capable of providing connectivity for user device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 250. Additionally, or alternatively, PGW 225 may receive traffic from network 250, and may send the traffic to user device 205 via SGW 220 and base station 210. PGW 225 may record data usage information (e.g., byte usage), and may provide the data usage information to AAA 240.

Messaging application server 230 includes one or more devices capable of receiving, processing, storing, generating, and/or providing information associated with an enterprise message (e.g., a message provided by messaging application server 230). For example, messaging application server 230 may include a server device (e.g., a host server, a web server, an application server, a server associated with a data center, etc.), a cloud computing device, an interactive voice response (IVR) device, or a similar device.

In some implementations, messaging application server 230 may generate an enterprise message, and may provide the enterprise message to user device 205 (e.g., via an enterprise messaging service of a wireless service provider being utilized by messaging application server 230 and/or user device 205). For example, messaging application server 230 may transmit the enterprise message (e.g., a bank confirmation code, a product offer, etc.) and the wireless service provider may route the message (e.g., via the EPC, the LTE network, etc.) to user device 205.

HSS 235 includes one or more devices, such as one or more server devices, capable of managing (e.g., receiving, generating, storing, processing, and/or providing) information associated with user device 205. For example, HSS 235 may manage subscription information associated with user device 205, such as information that identifies a subscriber profile of a user associated with user device 205, information that identifies services and/or applications that are accessible to user device 205, location information associated with user device 205, a network identifier (e.g., a network address) that identifies user device 205, information that identifies a treatment of user device 205 (e.g., quality of service information, a quantity of minutes allowed per time period, a quantity of data consumption allowed per time period, etc.), and/or similar information. HSS 235 may provide this information to one or more other devices of environment 200 to support the operations performed by those devices.

AAA 240 includes one or more devices, such as one or more server devices, that perform authentication, authorization, and/or accounting operations for communication sessions associated with user device 205. For example, AAA 240 may perform authentication operations for user device 205 and/or a user of user device 205 (e.g., using one or more credentials), may control access, by user device 205, to a service and/or an application (e.g., based on one or more restrictions, such as time-of-day restrictions, location restrictions, single or multiple access restrictions, read/write restrictions, etc.), may track resources consumed by user device 205 (e.g., a quantity of voice minutes consumed, a quantity of data consumed, etc.), and/or may perform similar operations.

Enterprise server 245 includes one or more devices capable of receiving, processing, storing, generating, and/or providing information associated with a message. For example, enterprise server 245 may include a server device (e.g., a host server, a web server, an application server, etc.), a cloud computing device, or a similar device.

Network 250 includes one or more wired and/or wireless networks. For example, network 250 may include a cellular network (e.g., a 5G network, an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
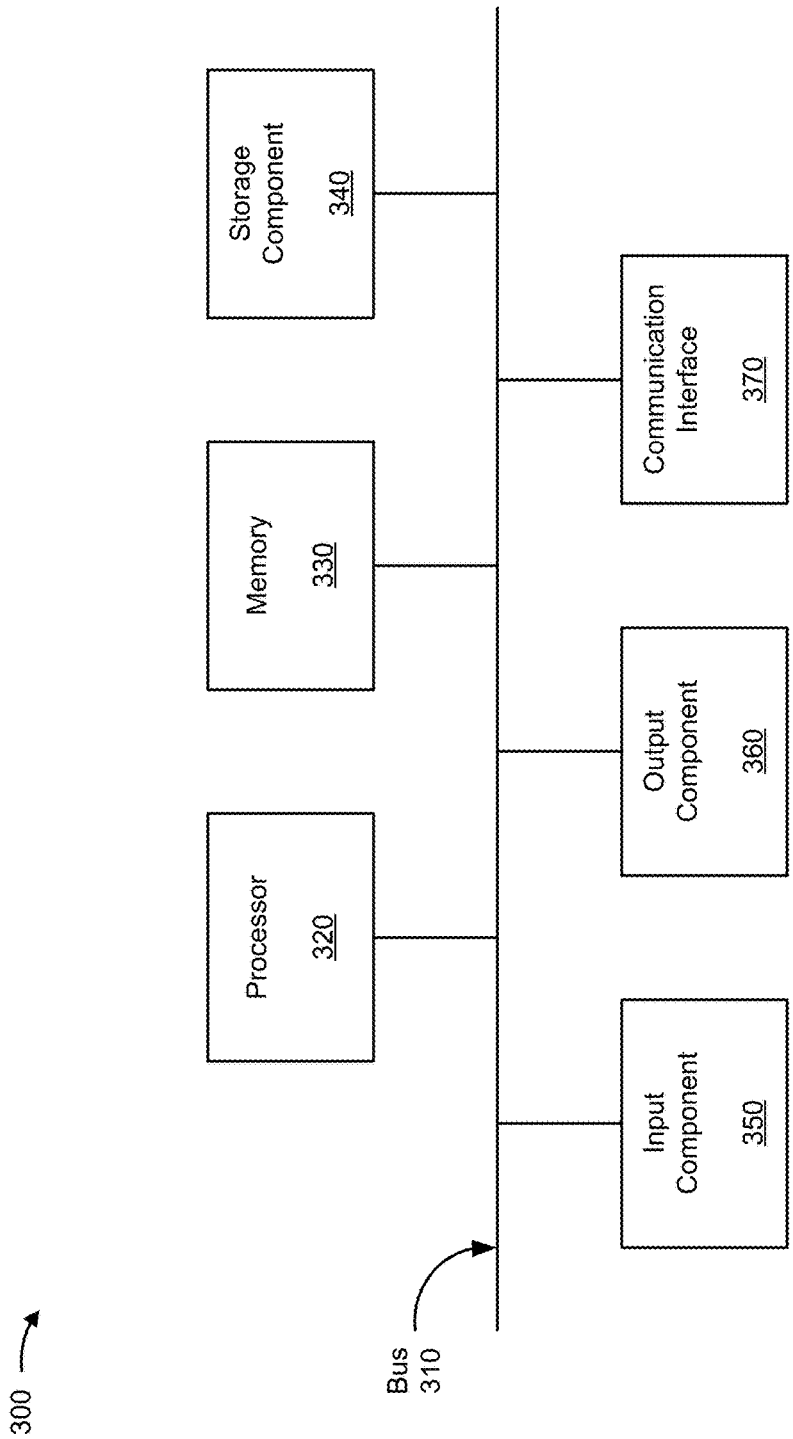
FIG. 3 is a diagram of example components of one or more devices of FIG. 2.

FIG. 3 is a diagram of example components of a device 300. Device 300 may correspond to user device 205, base station 210, MME 215, SGW 220, PGW 225, messaging application server 230, HSS 235, AAA 240, and/or enterprise server 245. In some implementations, user device 205, base station 210, MME 215, SGW 220, PGW 225, messaging application server 230, HSS 235, AAA 240, and/or enterprise server 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
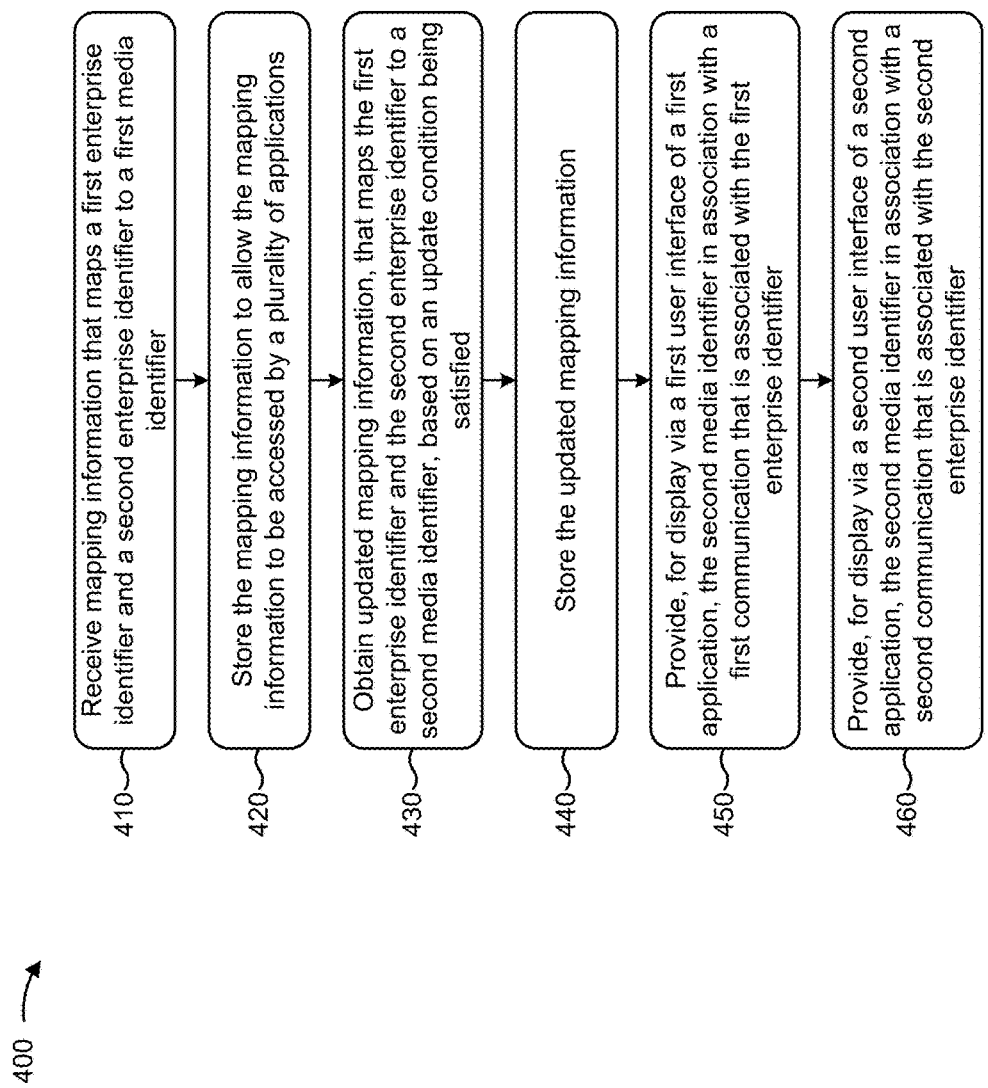
FIG. 4 is a flow chart of an example process for providing media identifiers in association with enterprise messages.

FIG. 4 is a flow chart of an example process 400 for providing media identifiers in association with enterprise messages. In some implementations, one or more process blocks of FIG. 4 may be performed by user device 205. In some implementations, one or more process blocks of FIG. 4 may be performed by another device or a group of devices separate from or including user device 205, such as base station 210, MME 215, SGW 220, PGW 225, messaging application server 230, HSS 235, AAA 240, and/or enterprise server 245.

As shown in FIG. 4, process 400 may include receiving mapping information that maps a first enterprise identifier and a second enterprise identifier to a first media identifier (block 410). For example, user device 205 may receive, from enterprise server 245, mapping information that maps a first enterprise identifier and a second enterprise identifier to a first media identifier. In some implementations, the mapping information may include a first set of enterprise identifiers and a first set of media identifiers. In other words, the first enterprise identifier and the second enterprise identifier may belong to a set of enterprise identifiers that are associated with an enterprise. Alternatively, the mapping information may map a single enterprise identifier (i.e., the first enterprise identifier) to one or more media identifiers. In other words, the mapping information may map a single enterprise identifier to a single media identifier in some cases.

In some implementations, the mapping information may include information that identifies an enterprise identifier, a media identifier, an application identifier, an expiration indicator, an update indicator, thread configuration information, or the like, as described elsewhere herein. In some implementations, the mapping information may be specific to a particular geolocation, a time zone, a device type (i.e., a device model), a device version, an operating system type (e.g., iOS, Android, BlackBerry OS, etc.), an operating system version, a user interface type, a user interface version, a screen parameter (e.g., screen dimensions, a screen size, etc.), an application, a time frame, or the like.

In some implementations, an enterprise identifier may include information that identifies a network address, a short code, a long code, a telephone number, an email address, an instant messaging (IM) address, a Twitter address, a SnapChat address, an Instagram address, or the like. In some implementations, a media identifier may include information that identifies a logo, an avatar, an icon, a sound, an image, a video, or the like. In some implementations, an application identifier may include information that identifies an application of user device 205 that may utilize the mapping information, as described elsewhere herein.

In some implementations, user device 205 may receive the mapping information based on a request, an update condition, a connection to a network, an opt-in process, or the like. Additionally, or alternatively, user device 205 may receive mapping information associated with particular enterprises. For example, user device 205 may provide, to enterprise server 245, information that identifies particular enterprises for which user device 205 is to receive mapping information.

In some implementations, the mapping information may include a set of one-to-one pairings (i.e., a single enterprise identifier to a single media identifier), a set of many-to-one pairings (i.e., multiple enterprise identifiers to a particular media identifier), a set of one-to-many pairings (i.e., a single enterprise identifier to multiple media identifiers), or the like. In the case of one-to-many pairings, user device 205 may map the single enterprise identifier to respective media identifiers based on application identifiers.

In some implementations, the mapping information may represent a third party verification, for user device 205, that each enterprise identifier, of the set of enterprise identifiers, corresponds to a respective media identifier of the set of media identifiers. For example, an entity associated with enterprise server 245 may provide third party verification of the mapping information. In this way, implementations described herein reduce a number of instances where a user of user device 205 causes user device 205 to perform a search for information associated with an enterprise identifier, thereby conserving processor and/or memory resources of user device 205 and conserving network resources.

In some implementations, the mapping information may include thread configuration information. For example, thread configuration information may include information that indicates a manner in which user device 205 is to consolidate multiple enterprise messages into a single message thread. In some implementations, messaging application server 230 may provide the thread configuration information to enterprise server 245. For example, messaging application server 230 may provide information, such as a flag, that indicates that enterprise messages, associated with particular enterprise identifiers, are to be consolidated into a single message thread that may be provided for display via a single user interface.

In some implementations, the thread configuration information may include information that identifies a set of enterprise identifiers. For example, the thread configuration information may include information that identifies each enterprise identifier for which corresponding enterprise messages are to be consolidated into the single message thread (e.g., "444-111," "444-112," "444-113," etc.). As another example, the thread configuration information may identify a set of common values associated with enterprise identifiers for which corresponding enterprise messages are to be consolidated into the single message thread (e.g., "444*").

In some implementations, the mapping information may include an expiration indicator. For example, the expiration indicator may include information that identifies a time, a time frame, an event, or the like, that causes user device 205 to obtain updated mapping information. In some implementations, the expiration indicator may be applicable to the entirety of the mapping information, some of the mapping information, or the like. Put another way, each enterprise identifier to media identifier pairing may be associated with the same expiration indicator (meaning that all of the mapping information will simultaneously be outdated) or different expiration indicators (meaning that one enterprise identifier to media identifier pairing may become outdated before another enterprise identifier to media identifier pairing).

In some implementations, the expiration indicator may be universal, such as the same time for a set of geographically dispersed user devices 205. As an example, an expiration indicator of December 26$^{th}$ at 12:00 AM GMT may correspond to December 25$^{th}$ at 8:00 PM EST for a first user device 205 that is located in Virginia, and December 25$^{th}$ at 5:00 PM PST for a second user device 205 that is located in California. That is, the first user device 205 and the second user device 205 may determine that an update condition, as described elsewhere herein, is satisfied substantially concurrently.

Alternatively, the expiration indicator may be specific to user device 205. For example, and in association with an expiration indicator of December 26$^{th}$ at 12:00 AM, a first user device 205 that is located in Virginia may obtain updated mapping information at 12:00 AM EST, and a second user device 205 that is located in California may obtain updated mapping information at 12:00 AM PST.

In some implementations, the mapping information may be associated with a geolocation identifier. For example, a geolocation identifier may include information that identifies a particular geolocation or geolocations for which the mapping information is applicable. In other words, first mapping information may be associated with a first geolocation, and second mapping information may be associated with a second geolocation. In some implementations, and as described elsewhere herein, user device 205 may determine that an update condition is satisfied based on a geolocation indicator associated with the mapping information.

In some implementations, the mapping information may include an update indicator. For example, an update indicator may include information that identifies a time at which enterprise server 245 received mapping information from messaging application server 230, a time at which the mapping information was updated (i.e., an update time), a time at which the mapping information should be updated, or the like. In some implementations, the update indicator may identify a version associated with the mapping information.

As further shown in FIG. 4, process 400 may include storing the mapping information to allow the mapping information to be accessed by a plurality of applications (block 420). For example, user device 205 may store, in a data structure, the mapping information to allow the mapping information to be accessed by a plurality of applications of user device 205.

In some implementations, user device 205 may store the mapping information locally (i.e., a data structure local to user device 205), externally (e.g., a data structure associated with a cloud server, a data structure associated with an external device, or the like), or the like. In some implementations, user device 205 may save a file (e.g., .vcf file, .txt file, .xml file, or the like) and provide the file to the applications, and/or other user devices 205.

In some implementations, user device 205 may enable a set of applications to access the data structure and the mapping information. For example, an application, of the set of applications, may include an application that is capable of being executed by user device 205, such as an address book application, a contacts application, a phone dialer application, an SMS application, an ephemeral messaging application, a messaging application, an email application, a conferencing application, a gaming application, a map application, a social media application, an application associated with an enterprise, or the like.

In some implementations, a contacts application of user device 205 may store the mapping information. For example, the contacts application may create (or update) an entry that includes information identifying the name of the enterprise, a set of media identifiers, a set of enterprise identifiers, etc. Additionally, or alternatively, the contacts application may enable other applications (e.g., a phone dialer application, an email application, a messaging application, etc.) to utilize the mapping information that is stored in association with the entry. Additionally, or alternatively, the contacts applications may provide, to other user devices 205 and/or server devices, information associated with the entry, such as via a .vcf file. In this way, implementations described herein reduce an amount of manual configuration of entries based on automatically syncing enterprise information across user devices 205 and/or user accounts associated with cloud applications.

In some implementations, respective applications of user device 205 may identify particular enterprise identifiers, media identifiers, application identifiers, etc. to be used in association with enterprise communications (e.g., SMS messages, calls, email messages, etc.). For example, a first application (i.e., an SMS application) may identify a first enterprise identifier (i.e., a short code) that is mapped to a first media identifier (i.e., a logo of the enterprise). Continuing the example, a second application (i.e., a phone dialer application) may identify a second enterprise identifier (i.e., a telephone number) that is mapped to the first media identifier (i.e., the logo of the enterprise).

In some implementations, different media identifiers may be mapped to a particular enterprise identifier. In this case, different applications may identify particular media identifiers to use based on application identifiers associated with the mapping information. For example, a first application identifier that identifies an SMS application may map the enterprise identifier to a first media identifier, and a second application identifier that identifies another type of messaging application may map the enterprise identifier to a second media identifier that is different than the first media identifier.

In this way, multiple applications of user device 205 may access the mapping information that is stored by user device 205. Additionally, the multiple applications may receive and/or provide respective communications (e.g., SMS messages, phone calls, IMs, etc.) and provide, for display via respective user interfaces, media identifiers in association with the respective communications, as described elsewhere herein.

As further shown in FIG. 4, process 400 may include obtaining updated mapping information, that maps the first enterprise identifier and the second enterprise identifier to a second media identifier, based on an update condition being satisfied (block 430). For example, user device 205 may obtain updated mapping information that maps the first enterprise identifier and the second enterprise identifier to a second media identifier, based on an update condition being satisfied.

In some implementations, the updated mapping information may include some different mapping information as compared to the mapping information or entirely different mapping information as compared to the mapping information. In other words, some or all of the enterprise identifier to media identifier pairings may be different. In some implementations, an update condition may refer to a condition whereby the mapping information is outdated, is to be updated, is expired, or the like.

In some implementations, the update condition may be satisfied based on an expiration indicator. For example, user device 205 may determine that the update condition is satisfied based on an expiration indicator. As an example, the expiration indicator may include information that identifies a time (e.g., December $26^{th}$ at 12:00 AM) at which user device 205 is to obtain updated mapping information, to utilize updated mapping information (and not utilize outdated mapping information), or the like. In other words, the expiration indicator may identify an expiration time associated with the mapping information (e.g., which may be rendered outdated based on updated mapping information). In some implementations, the expiration indicator may be universal (i.e., the same for user devices 205), may be user device 205 specific (i.e., different for user devices 205 that are associated with different geolocations, time zones, and/or other characteristics), or the like.

In some implementations, user device 205 may compare a time identified by the expiration indicator to a current local time associated with a geolocation of user device 205. In this case, if user device 205 determines that the current local time is later than, or the same as, the time identified by the expiration indicator, user device 205 may determine that the update condition is satisfied, and obtain updated mapping information. For example, user device 205 may provide, to enterprise server 245, a request for updated mapping information based on the update condition being satisfied.

In some implementations, the update condition may be satisfied based on an update indicator. For example, user device 205 may determine that the update condition is satisfied based on an update indicator. In some implementations, enterprise server 245 may store information that identifies the update indicator, and user device 205 may obtain information associated with the update indicator. For example, user device 205 may obtain information that identifies the update indicator based on user device 205 executing an application, causing the messaging application to execute in the foreground, providing, for display via a user interface, information associated with the messaging application, connecting to an access network, being associated with a particular geolocation, or the like. Additionally, or alternatively, user device 205 may request information associated with an update indicator periodically (e.g., every day, every three days, every week, etc.).

In some implementations, user device 205 may store, in a data structure, information that identifies a time at which user device 205 received mapping information from enterprise server 245. In some implementations, user device 205 may determine that the update condition is satisfied based on comparing a time at which user device 205 received mapping information from enterprise server 245 (e.g., a first time) and a time associated with an update indicator (e.g., a second time). In situations where the second time is more recent than the first time, user device 205 may determine that the update condition is satisfied.

In some implementations, user device 205 may store, in a data structure, information associated with a version identifier of mapping information that is stored by user device 205. Additionally, or alternatively, user device 205 may compare a first version identifier associated with mapping information that is stored by user device 205 and a second version identifier associated with mapping information that is stored by enterprise server 245 (e.g., identified by an update indicator). Additionally, or alternatively, user device 205 may determine that the update condition is satisfied based on comparing version identifiers, such as when the first version identifier is less than the second version identifier.

In some implementations, enterprise server 245 may receive, from user device 205, information that identifies the mapping information that is stored by user device 205. Additionally, or alternatively, enterprise server 245 may compare information associated with the updated mapping information and information that identifies the mapping information that is stored by user device 205, and determine a difference between the updated mapping information and the mapping information that is stored by user device 205. In this case, enterprise server 245 may provide, to user device 205, updated mapping information based on the difference.

In some implementations, the update condition may be satisfied based on subscription information. For example, enterprise server 245 may determine that the update condition is satisfied based on receiving updated mapping information from messaging application server 230. In some implementations, subscription information may identify an enterprise for which user device 205 is subscribed to receive enterprise messages. In some implementations, enterprise server 245 may receive the subscription information from user device 205 (e.g., based on an opt-in selection indicating that a user of user device 205 wishes to receive enterprise messages, based on a default setting of a messaging application of user device 205, based on user device 205 executing a particular application, or the like).

In some implementations, enterprise server 245 may store, in a data structure, the subscription information associated with user device 205. Additionally, when enterprise server 245 receives updated mapping information from messaging application server 230, enterprise server 245 may compare the updated mapping information and the subscription information. Based on comparing the updated mapping information and the subscription information, enterprise server 245 may provide (e.g., push) the updated mapping information to user device 205. In this way, user device 205 may receive real-time updates to mapping information (i.e., substantially concurrently with enterprise server 245 receiving the updated mapping information from messaging application server 230).

In some implementations, the update condition may be satisfied based on a geolocation (or a variation in geolocation) of user device 205. For example, user device 205 may determine that the update condition is satisfied based on a geolocation indicator. In some implementations, user device 205 may determine that the mapping information is not applicable to a particular geolocation, and request updated mapping information associated with the particular geolocation. In this way, user device 205 may provide, for display, a media identifier that is more applicable to a particular geolocation associated with user device 205 than as compared to other mapping information. For example, an enterprise may be associated with various names, logos, themes, etc. that correspond to particular geolocations. Additionally, or alternatively, the enterprise may desire to provide media identifiers that correspond to a particular geolocation, that depict particular information that is germane to the particular geolocation, or the like.

As further shown in FIG. 4, process 400 may include storing the updated mapping information (block 440). For example, user device 205 may store, in a data structure, the updated mapping information. In some implementations, user device 205 may modify a data structure based on the updated mapping information. For example, user device 205 may store the updated mapping information, cause the mapping information, that was received in association with block 410 of FIG. 4, to be removed or replaced based on receiving the updated mapping information, or the like. In this way, user device 205 conserves memory resources by removing outdated and/or expired information that may not be utilized by user device 205.

As further shown in FIG. 4, process 400 may include providing, for display via a first user interface of a first application, the second media identifier in association with a first communication that is associated with the first enterprise identifier (block 450). For example, user device 205 may provide, for display via a user interface of a first application, the second media identifier in associated with a first communication that is associated with the first enterprise identifier.

In some implementations, messaging application server 230 and/or another set of devices (e.g., phones, IVR devices, etc.) that are associated with an enterprise may communicate with user device 205 using a set of communication techniques, such as via SMS messaging, MMS messaging, voice calling, emailing, notifying, instant messaging, messaging, or the like. In some implementations, a communication may correspond to a communication technique. In other words, user device 205 may implement a communication technique, such as SMS messaging, to provide and/or receive communications, such as SMS messages.

In some implementations, different applications of user device 205 may enable user device 205 to interact with messaging application server 230 and/or other devices via different communication techniques. As examples, user device 205 may provide SMS messages via a messaging application, calls via a phone dialer application, IMs via an instant message application, emails messages via an email application, or the like. Additionally, or alternatively, different applications may receive and/or provide communications that are associated with different enterprise identifiers. As an example, user device 205 may receive, from messaging application server 230 and in association with an SMS application, SMS messages that are associated with short codes. Continuing the example, user device 205 may provide, to another device and in association with a phone dialer application, a call in association with a telephone number of the enterprise. In other words, different communication techniques may rely on particular enterprise identifiers and/ or may not be compatible with other types of enterprise identifiers.

In some implementations, the first application may include a messaging application. In this case, user device 205 may receive, from messaging application server 230, an enterprise message that is associated with an enterprise identifier, and map the enterprise identifier to the second media identifier based on the updated mapping information.

In some implementations, user device 205 may receive, from messaging application server 230, enterprise messages that are associated with different enterprise identifiers. Additionally, or alternatively, user device 205 may identify, using a data structure, that the enterprise messages are to be consolidated into a single message thread. For example, user device 205 may determine, based on thread configuration information, that the enterprise messages are to be consolidated into a single message thread. Additionally, or alternatively, user device 205 may provide, for display via a user interface of the messaging application, the media identifier and the enterprise messages in a single message thread. In other words, user device 205 may provide, for display via a user interface, the media identifier and the enterprise messages in a single message thread as compared to providing individual enterprise messages in separate threads based on different enterprise identifiers.

In some implementations, a user may interact with user device 205 to reply to an enterprise message that is associated with the single message thread of enterprise messages. In some implementations, user device 205 may identify an enterprise identifier for which to use when providing the reply. For example, user device 205 may identify an enterprise identifier associated with the most recent enterprise message in the single message thread of enterprise messages, and send a reply message to a device associated with the identified enterprise identifier. Additionally, or alternatively, user device 205 may identify a context associated with the conversation, and send the reply message to a device based on the context.

As further shown in FIG. 4, process 400 may include providing, for display via a second user interface of a second application, the second media identifier in association with a second communication that is associated with the second enterprise identifier (block 460). For example, user device 205 may provide, for display via a second user interface of a second application, the second media identifier in association with a second communication that is associated with a second enterprise identifier.

In some implementations, the second application may include a different application than the first application. Additionally, or alternatively, the second application may be associated with a different communication technique than as compared to the first application. Additionally, or alternatively, the second communication may be different than the first communication, and/or may be a different type of communication than as compared to the first communication. For example, the first application may include an SMS application, whereas the second application may include a phone dialer application. Continuing the example, the first communication may include an SMS message whereas the second communication may include a voice call.

In some implementations, user device 205 may determine, based on the mapping information (i.e., an application identifier), a particular media identifier to provide for display via a user interface. For example, user device 205 may identify, based on an application that is associated with the second communication and/or is being executed, a media identifier that is to be provided for display.

In this way, user device 205 may provide, for display via respective user interfaces of respective applications of user device 205, media identifiers associated with different communications and/or communication types. Thereby, implementations described herein enhance user experience, reduce manual configuration of user device 205, reduce an amount of external searches performed by user device 205, reduce an amount of user interactions (e.g., touch gestures) associated with enterprise communications, reduce phishing efficacy, etc. In this way, and by reducing the amount of configuration and/or interaction with user device 205, implementations described herein enhance security, conserve processor and/or memory resources of user device 205 and conserve network resources.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
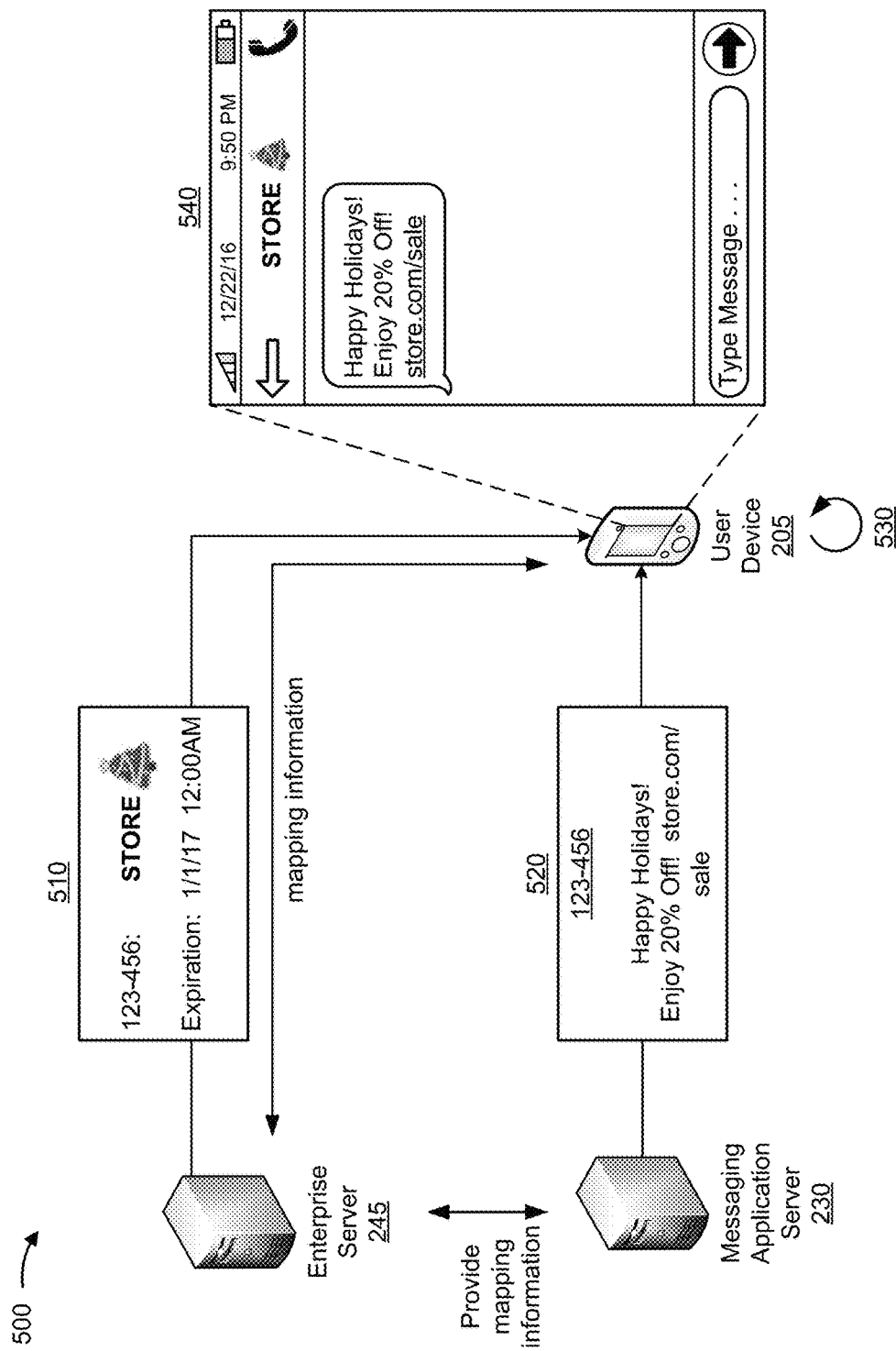
FIGS. 5A and 5B are diagrams of an example implementation relating to the example process shown in FIG. 4.
Figure 5B:
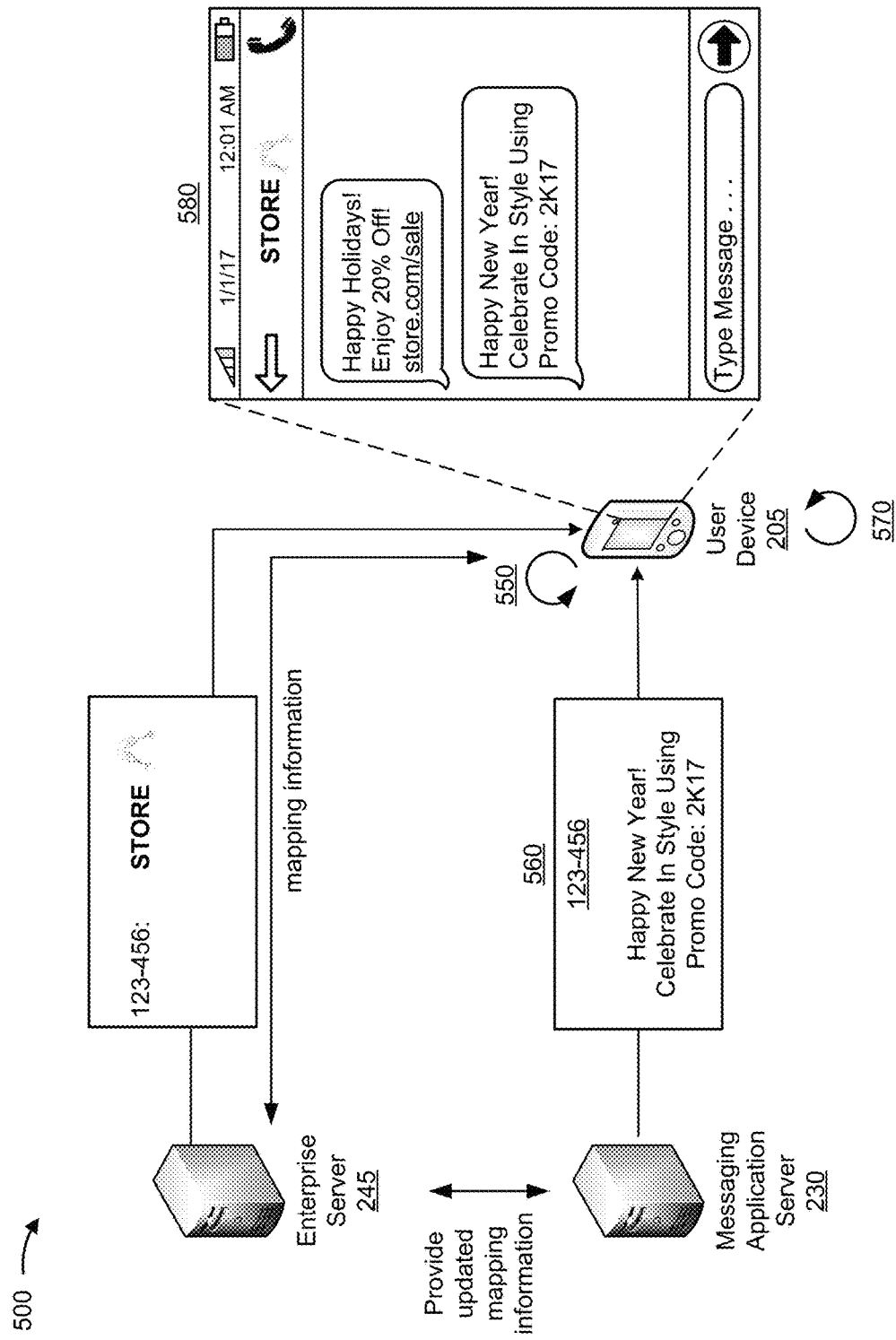

FIGS. 5A and 5B are diagrams of an example implementation 500 relating to example process 400 shown in FIG. 4. FIGS. 5A and 5B show an example of providing media identifiers in association with enterprise messages.

As shown in FIG. 5A, and by reference number 510, user device 205 may receive, from enterprise server 245, mapping information that includes an expiration indicator. For example, as shown, the mapping information may include information associated with an enterprise identifier (i.e., a short code shown as "123-456"), a media identifier (i.e., a logo shown as "STORE" next to a holiday image), and an expiration indicator associated with the mapping information (i.e., an expiration time of "12:00 AM" on "Jan. 1, 2017").

As further shown in FIG. 5A, and by reference number 520, messaging application server 230 may provide, to user device 205, an enterprise message that is associated with an enterprise identifier. For example, as shown, the enterprise message may be associated with the enterprise identifier "123-456" and may include the message "Happy Holidays! Enjoy 20% Off! store.com/sale."

As further shown in FIG. 5A, and by reference number 530, user device 205 may map the enterprise identifier to a media identifier based on the mapping information. For example, user device 205 may map the enterprise identifier "123-456" to the media identifier based on the mapping information and display the media identifier (e.g., store name and logo) in lieu of the enterprise identifier "123-456." This provides the user with a visual representation of the source of the message instead of a numeric enterprise identifier and is presented in a format that is similar to messages received by user device 205 from other non-enterprise sources.

As further shown in FIG. 5A, and by reference number 540, user device 205 may provide, for display via a user interface, the media identifier with the enterprise message based on mapping the enterprise identifier to the media identifier. For example, as shown, user device 205 may display the logo while displaying the enterprise message.

As shown in FIG. 5B, and by reference number 550, user device 205 may determine that an update condition associated with the mapping information is satisfied. For example, user device 205 may determine that a current time (e.g., based on a clock of user device 205 identifying a time in the current location of user device 205) is later than the expiration time "12:00 AM" on "Jan. 1, 2017," and may obtain updated mapping information based on determining that the current time is later than the expiration time. For example, as shown, the updated mapping information may include information associated with an enterprise identifier (i.e., a short code shown as "123-456"), and an updated media identifier (i.e., a logo shown as "STORE" next to an image of champagne glasses).

As further shown in FIG. 5B, and by reference number 560, user device 205 may receive, from messaging application server 230, an enterprise message associated with the enterprise identifier "123-456." For example, user device 205 may receive the enterprise message "Happy New Year! Celebrate In Style Using Promo Code: 2K17" from messaging application server 230.

As further shown in FIG. 5B, and by reference number 570, user device 205 may map the enterprise identifier to an updated media identifier based on the updated mapping information. For example, based on the updated mapping information, user device 205 may map the enterprise identifier "123-456" to the updated media identifier.

As further shown in FIG. 5B, and by reference number 580, user device 205 may provide, for display via a user interface, the media identifier with the enterprise message based on mapping the enterprise identifier to the media identifier. For example, as shown, user device 205 may display the updated media identifier with the enterprise message. In this way, user device 205 enhances a user experience by updating media identifiers in real-time (e.g., substantially concurrently with an event, with a time, or the like), thereby enabling a user to view media identifiers that are more appropriate for a particular context, event, time frame, or the like. It is to be understood, that the media identifier can be updated for any number of reasons and any number of times. For example an enterprise may wish to have a promotional media identifier, a themed media identifier, a regional identifier, a rebranded media identifier, etc. Enterprise server 245 allows the enterprise to plan for, update and implement various media identifiers to all users or a subset of users on a scheduled basis.

While FIGS. 5A and 5B describe user device 205 providing, for display via the user interface, the updated media identifier based on a second enterprise message (e.g., associated with reference number 560), it should be understood that user device 205 may provide, for display via the user interface, the updated media identifier with the first enterprise message (e.g., without having received the second enterprise message).

Figure 6A:
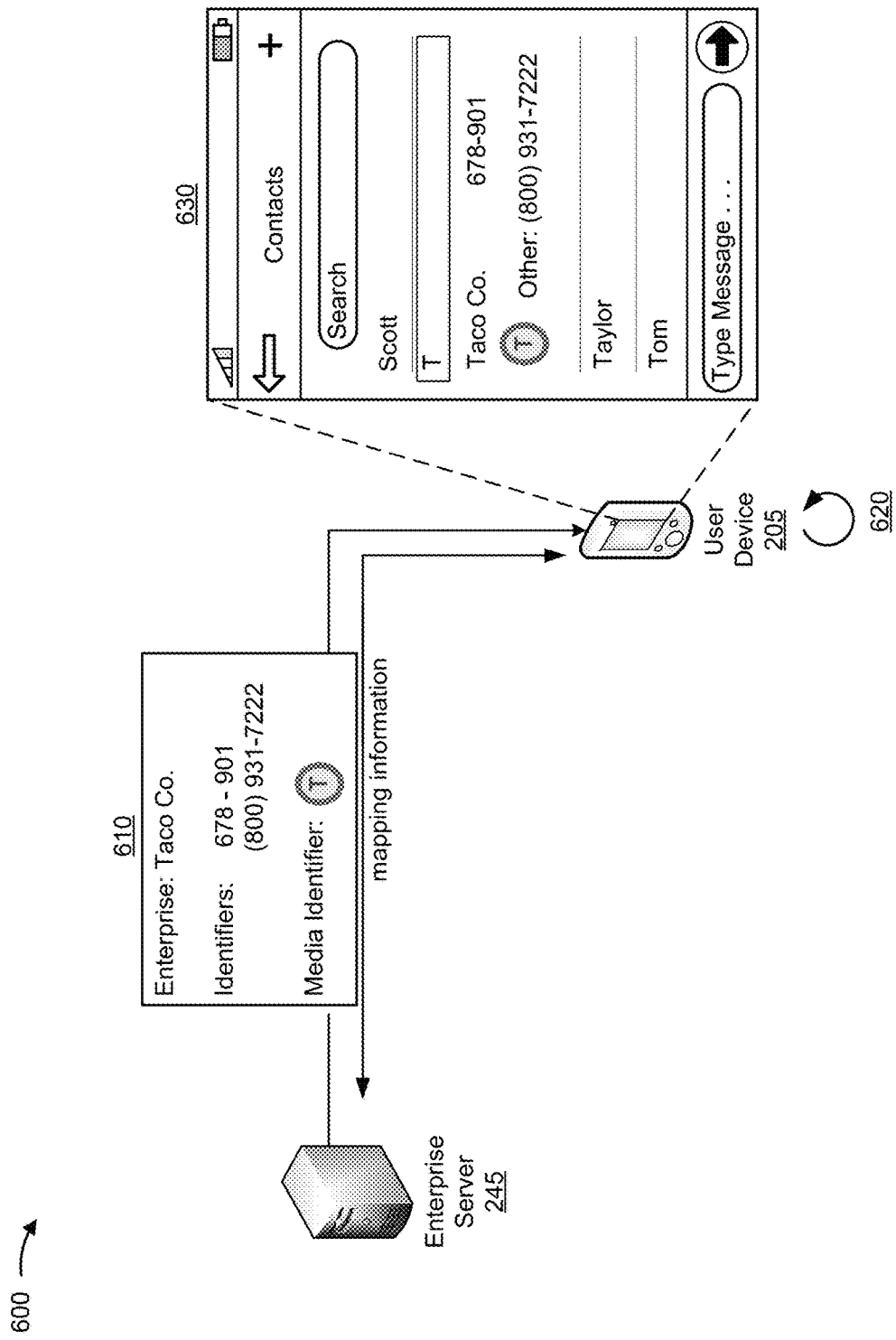
FIGS. 6A-6C are diagrams of another example implementation relating to the example process shown in FIG. 4.
Figure 6B:
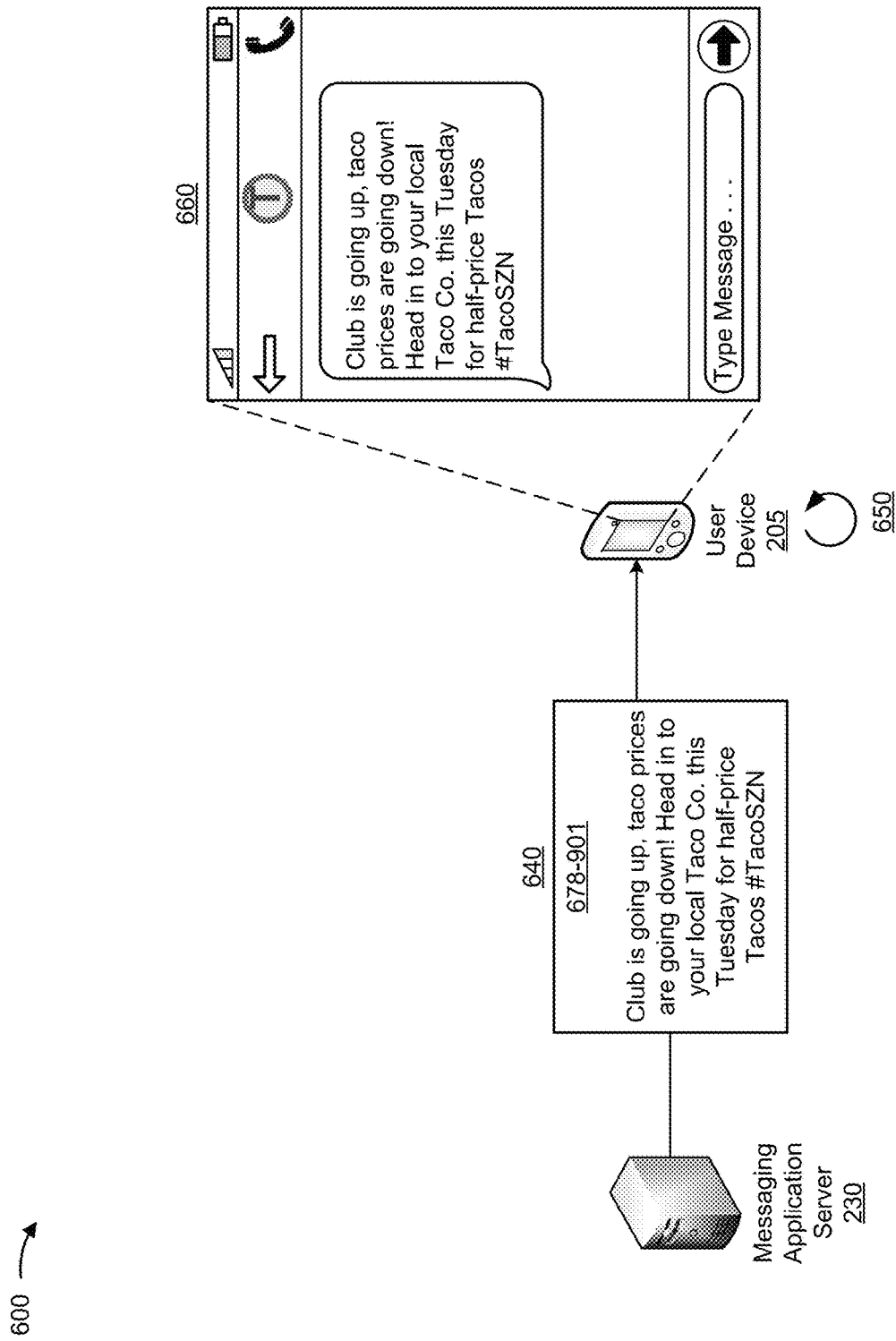
Figure 6C:
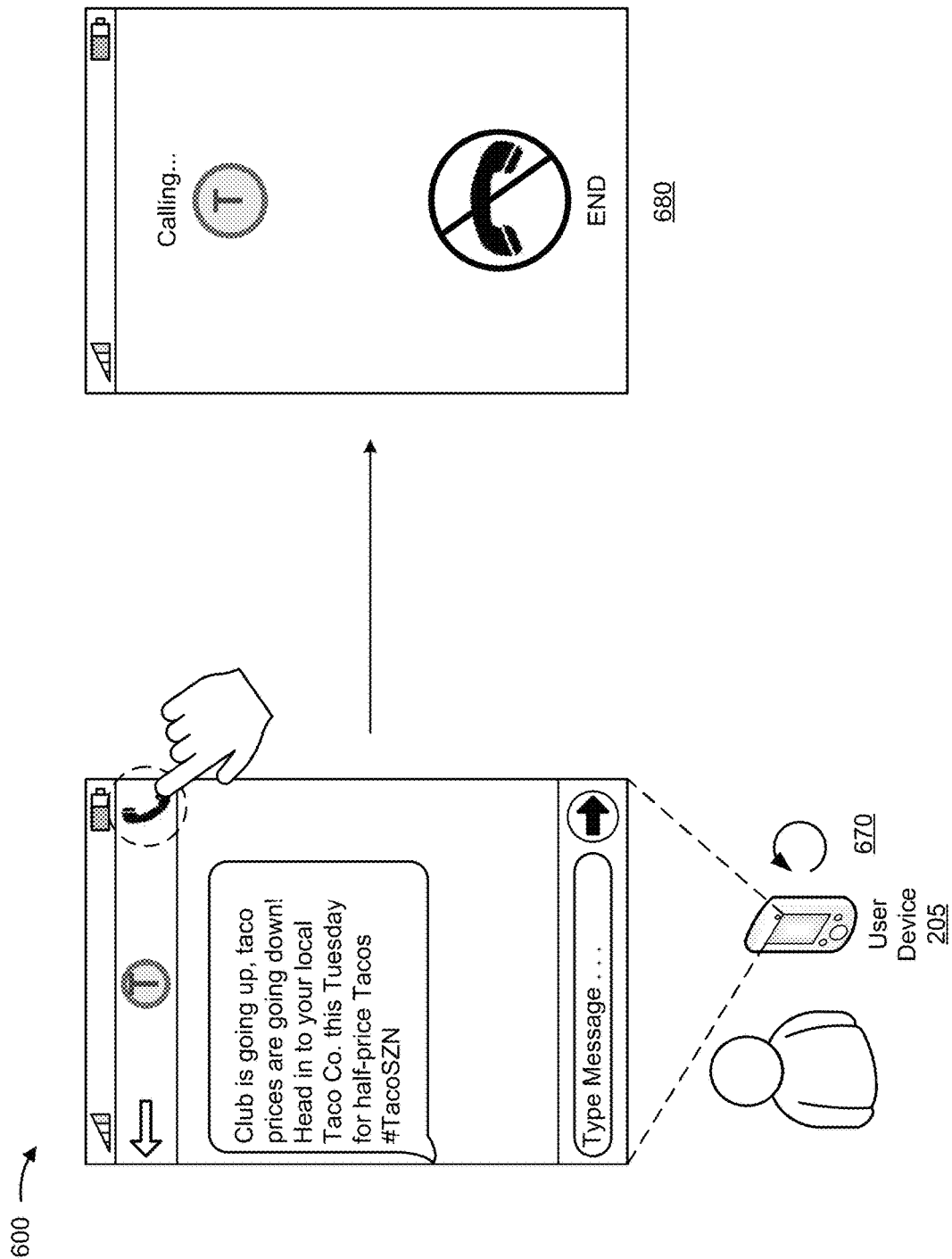

FIGS. 6A-6C are diagrams of an example implementation 600 relating to example process 400 shown in FIG. 4. FIGS. 6A-6C show an example of providing media identifiers in association with enterprise messages.

As shown in FIG. 6A, and as shown by reference number 610, user device 205 may receive, from enterprise server 245, mapping information associated with mapping a set of enterprise identifiers to a set of media identifiers. For example, for an enterprise "Taco Co.," the mapping information may include a first enterprise identifier (i.e., short code "678-901"), a second enterprise identifier (i.e., telephone number "(800) 111-1111"), and a media identifier (i.e., a logo of Taco Co.).

In some implementations, the mapping information may include multiple enterprise identifiers. In some implementations, the multiple enterprise identifiers may include multiple telephone numbers associated with an enterprise. For example, the multiple enterprise identifiers may include multiple telephone numbers that are associated with respective Taco Co. restaurants. In some implementations, enterprise server 245 may provide a particular set of enterprise identifiers (e.g., telephone numbers) associated with the enterprise based on information associated with user device 205. For example, enterprise server 245 may identify particular stores that are located within a threshold proximity to user device 205 based on a geolocation of user device 205, identify particular stores based on a device identifier of user device 205 (e.g., a mobile directory number (MDN), International Mobile Equipment Identity (IMEI), Internet Protocol (IP) address, or the like), identify particular stores based on a user input, or the like, and provide enterprise identifiers for those particular stores.

As further shown in FIG. 6A, and as shown by reference number 620, user device 205 may store the mapping information, and update an entry associated with a contacts application of user device 205. For example, as shown by reference number 630, user device 205 may store an entry that identifies the enterprise, includes the enterprise identifiers of the enterprise, and includes the media identifier of the enterprise. In some implementations, user device 205 may enable other applications to access the information associated with the entry, may provide a .vcf file that includes the mapping information to another user device 205, may provide the mapping information to a cloud server, or the like.

As shown in FIG. 6B, and as shown by reference number 640, user device 205 may receive, from messaging application server 230, an enterprise message that is associated with a first enterprise identifier (i.e., short code "678-901"). As shown by reference number 650, user device 205 may map the first enterprise identifier to a media identifier based on the mapping information. As shown by reference number 660, user device 205 may provide, for display via a user interface, the media identifier with the enterprise message.

As shown in FIG. 6C, a user may interact with user device 205 by performing a touch gesture in association with a phone icon that is being provided for display via a user interface of user device 205. For example, assume that the user desires to locate a nearby Taco Co. restaurant, desires to place an order at a Taco Co. restaurant, or the like. In this case, and as shown by reference number 670, user device 205 may identify a particular enterprise identifier that is associated with the enterprise. For example, user device 205 may identify a particular enterprise identifier to call based on a geolocation of user device 205 (e.g., the closest restaurant), based on a user-preference (e.g., a user-selected restaurant, the restaurant that the user has visited the most, or the like), based on a time of day, based on a day of the week, or the like.

As another example, user device 205 may identify a particular enterprise identifier to call based on an enterprise message associated with a messaging application. For example, assume that an enterprise message indicates (i.e., references) a particular Taco Co. restaurant. In this case, user device 205 may identify an enterprise identifier associated with the particular Taco Co. restaurant.

In other implementations, user device 205 may identify an enterprise identifier to call (or message) based on an enterprise message and/or a message provided by user device 205. For example, assume that a user of user device 205 causes user device 205 to provide a message requesting assistance with a user query. In this case, user device 205 may identify an enterprise identifier to call, such as a customer assistance number, based on the message. In this way, user device 205 may identify a context associated with a set of enterprise messages and/or user messages, and identify an enterprise identifier based on the context, thereby enabling a user of user device 205 to be put in contact with an appropriate party.

As another example, user device 205 may provide, for display via a user interface, a set of enterprise identifiers (e.g., associated with a set of nearby Taco Co. restaurants) and information associated with the enterprise identifiers (e.g., a distance to the respective restaurants, reviews of the respective restaurants, respective hours of operation, or the like). Additionally, user device 205 may receive, based on a user input, information that identifies a selection of a particular restaurant. Additionally, or alternatively, user device 205 may execute another application to provide information associated with the particular restaurant (e.g., a map application, a reservation application, or the like).

As shown by reference number 680, user device 205 may provide, for display via a user interface, a media identifier in association with another application of user device 205. For example, user device 205 (e.g., a phone dialer application) may call a telephone number and provide, for display via the user interface, the media identifier in association with the call. In this way, a user of user device 205 may more accurately discern that the user is calling a number associated with the enterprise.

As indicated above, FIGS. 6A-6C are provided merely as an example. Other examples are possible and may differ from what was described with regard to FIGS. 6A-6C.

Figure 7A:
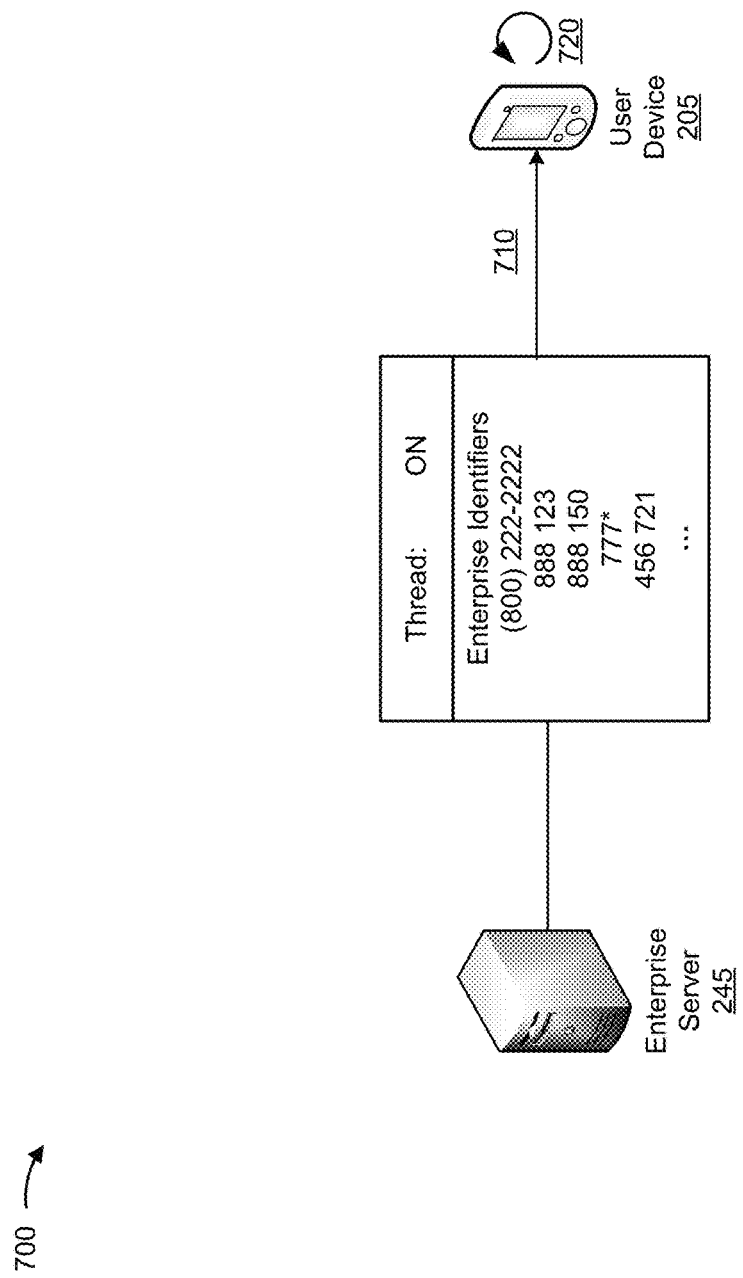
FIGS. 7A-7C are diagrams of another example implementation relating to the example process shown in FIG. 4.
Figure 7B:
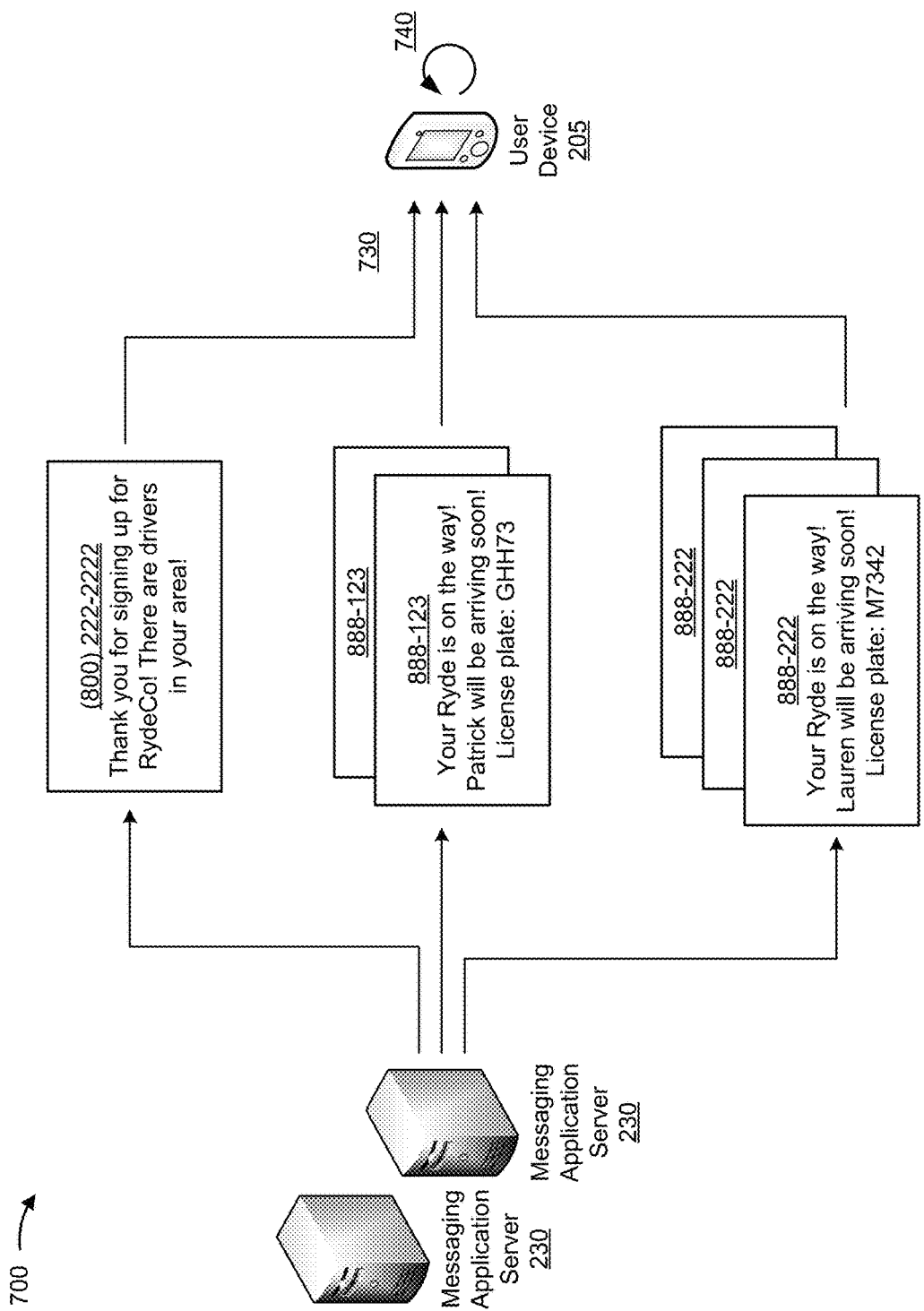
Figure 7C:
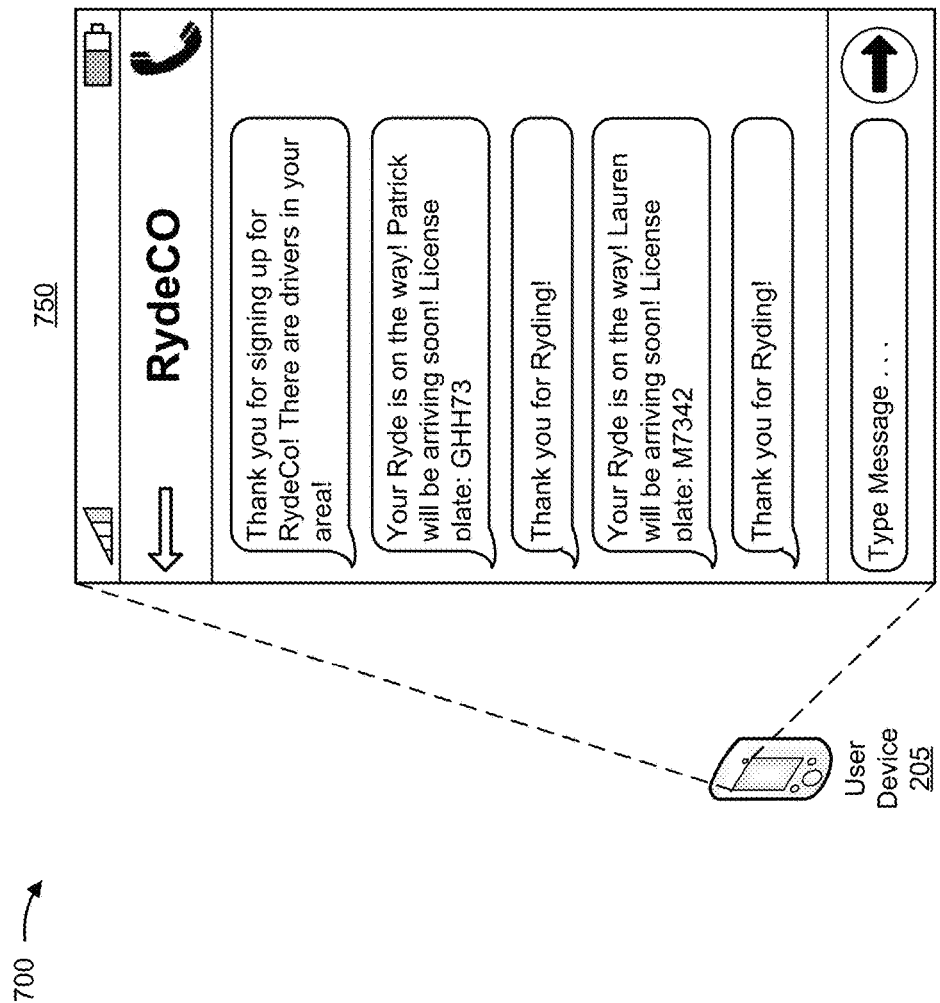

FIGS. 7A-7C are diagrams of an example implementation 700 relating to example process 400 shown in FIG. 4. FIGS. 7A-7C show an example of providing media identifiers in association with enterprise messages.

As shown in FIG. 7A, and as shown by reference number 710, user device 205 may receive mapping information associated with mapping a set of enterprise identifiers, associated with an enterprise, to a set of media identifiers, and may receive thread configuration information that identifies the set of enterprise identifiers. For example, as shown, the mapping information may include multiple enterprise identifiers (e.g., telephone number "(800) 222-2222," short code "888-123," short code "888-150," common value set "777*," and short code "456-721").

Additionally, as shown, the thread configuration information may include an "ON" flag that indicates that enterprise messages, associated with the set of enterprise identifiers, are to be consolidated into a single message thread of enterprise messages. As shown by reference number 720, user device 205 may store, in a data structure, the mapping information and thread configuration information.

As shown in FIG. 7B, and as shown by reference number 730, user device 205 may receive, from a set of enterprise servers 245, enterprise messages associated with different enterprise identifiers. As further shown in FIG. 7B, and as shown by reference number 740, user device 205 may determine to consolidate the enterprise messages into a single message thread based on the thread configuration information. It is to be understood that the different enterprise identifiers may be received at different times, may be received days or weeks apart, may be received when user device 205 is in a different geographic location, etc.

As shown in FIG. 7C, and as shown by reference number 750, user device 205 may provide, for display via a single user interface, the media identifier with a single message thread of messages that includes the enterprise messages. In this way, implementations described herein reduce resource consumption of user device 205 by providing a set of enterprise messages in a single message thread, sorted and stored based on enterprise and not based on an enterprise identifier number, as compared to multiple message threads. Thereby, the amount of resources required to track and store multiple conversations with the same enterprise is greatly reduced. Further, the user interactions with user device 205 and/or the amount of navigation between separate screens to read, respond, etc. to the enterprise messages is reduced.

As indicated above, FIGS. 7A-7C are provided merely as an example. Other examples are possible and may differ from what was described with regard to FIGS. 7A-7C.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, coupled to the one or more memories, to:
 receive mapping information that maps an enterprise identifier to a first media identifier,
  the mapping information representing a third party verification, for the device, that the enterprise identifier corresponds to the first media identifier;
 store the mapping information,
  storing the mapping information allowing the mapping information to be accessed by a plurality of applications of the device;
 obtain updated mapping information,
  the updated mapping information including a second media identifier to be associated with the enterprise identifier, and
  the updated mapping information being obtained based on an update condition being satisfied;
 store the updated mapping information,
  storing the updated mapping information causing the first media identifier to be replaced with the second media identifier;
 receive a communication that is associated with the enterprise identifier;
 receive another communication that is associated with another enterprise identifier,
  the enterprise identifier being different from the other enterprise identifier; and
 provide, for display via a user interface of an application, of the plurality of applications, of the device, the second media identifier in association with the communication
 associated with the enterprise identifier,
  the second media identifier being provided for display based on the updated mapping information and in association with a single message thread that includes the communication and the other communication, and
  the mapping information comprising thread configuration information that indicates a manner in which at least the communication and the other communication are to be consolidated into the single message thread.

2. The device of claim 1, where the one or more processors are further to:
  determine that the update condition is satisfied based on an expiration indicator associated with the mapping information; and
  where the one or more processors, when obtaining the updated mapping information, are to:
    obtain the updated mapping information based on determining that the update condition is satisfied.

3. The device of claim 1, where the one or more processors are further to:
  receive, from a server device, information that identifies an update indicator associated with the mapping information; and
  where the one or more processors, when obtaining the updated mapping information, are to:
    obtain the updated mapping information based on the updated indicator.

4. The device of claim 1, where the one or more processors are further to:
  provide, to a server device, subscription information that identifies an enterprise,
    the enterprise being associated with the updated mapping information; and
  where the one or more processors, when obtaining the updated mapping information, are to:
    obtain the updated mapping information based on the subscription information.

5. The device of claim 1, where the enterprise identifier is:
  a short code; or
  a long code.

6. The device of claim 1, where the one or more processors are further to:
  provide, for display via another user interface of another application of the device, the second media identifier in association with the other communication
  associated with the other enterprise identifier,
    the second media identifier being provided for display via the other user interface based on the updated mapping information, and
    the plurality of applications including the application and the other application.

7. A non-transitory computer-readable medium storing instructions, the instructions comprising:
  one or more instructions that, when executed by one or more processors of a device, cause the one or more processors to:
    receive mapping information that maps an enterprise identifier to a media identifier,
      the mapping information representing a third party verification, for the device, that the enterprise identifier corresponds to the media identifier;
    store the mapping information,
      storing the mapping information allowing the mapping information to be accessed by a plurality of applications of the device;
    obtain updated mapping information,
      the updated mapping information including a second media identifier to be associated with the enterprise identifier, and
      the updated mapping information being obtained based on an update condition being satisfied;
    store the updated mapping information;
    receive a communication that is associated with the enterprise identifier;
    receive another communication that is associated with another enterprise identifier,
      the enterprise identifier being different from the other enterprise identifier; and
    provide, for display via a user interface of an application of the device, the second media identifier in association with the communication
  associated with the enterprise identifier,
    the second media identifier being provided for display based on the updated mapping information and in association with a single message thread that includes the communication and the other communication, and
    the mapping information comprising thread configuration information that indicates a manner in which at least the communication and the other communication are to be consolidated into the single message thread.

8. The non-transitory computer-readable medium of claim 7, where the one or more instructions, when executed by the one or more processors, further cause the one or more processors to:
  compare a first time and a second time,
    the first time being associated with a geolocation of the device, and
    the second time being associated with an expiration of the mapping information; and
  where the one or more instructions, that cause the one or more processors to obtain the updated mapping information, cause the one or more processors to:
    obtain the updated mapping information based on comparing the first time and the second time.

9. The non-transitory computer-readable medium of claim 7, where the one or more instructions, when executed by the one or more processors, further cause the one or more processors to:
  compare a first time and a second time,
    the first time being associated with a first update time that is associated with the mapping information, and
    the second time being associated with a second update time that is associated with the updated mapping information; and
  where the one or more instructions, that cause the one or more processors to obtain the updated mapping information, cause the one or more processors to:
    obtain the updated mapping information based on comparing the first time and the second time.

10. The non-transitory computer-readable medium of claim 7, where the one or more instructions, when executed by the one or more processors, further cause the one or more processors to:
  provide, to a server device, information that identifies a set of enterprises,
    the set of enterprises including an enterprise that is associated with the communication; and
  where the one or more instructions, that cause the one or more processors to obtain the updated mapping information, cause the one or more processors to:
    obtain the updated mapping information based on the information that identifies the set of enterprises.

11. The non-transitory computer-readable medium of claim 7, where the one or more instructions, when executed by the one or more processors, further cause the one or more processors to:
  provide, for display via another user interface of another application of the device, the second media identifier in association with the other communication associated with the other enterprise identifier,
the second media identifier being provided for display via the other user interface based on the updated mapping information, and
the plurality of applications including the application and the other application.

12. The non-transitory computer-readable medium of claim 7, where the communication is provided for display without providing, for display, information that identifies the enterprise identifier.

13. A method, comprising:
receiving, by a device, mapping information that maps an enterprise identifier to a first media identifier,
the mapping information representing a third party verification, for the device, that the enterprise identifier corresponds to the first media identifier;
storing, by the device, the mapping information to allow the mapping information to be accessed by a plurality of applications of the device;
obtaining, by the device, updated mapping information based on an update condition being satisfied,
the updated mapping information including a second media identifier to be associated with the enterprise identifier;
storing, by the device, the updated mapping information;
receiving, by the device, a communication that is associated with the enterprise identifier;
receiving, by the device, another communication that is associated with another enterprise identifier,
the enterprise identifier being different from the other enterprise identifier;
storing the updated mapping information causing the first media identifier to be replaced with the second media identifier; and
providing, by the device and for display via a user interface of an application of the device, the second media identifier in association with
the communication associated with the enterprise identifier,
the second media identifier being provided for display based on the updated mapping information and in association with a single message thread that includes the communication and the other communication, and
the mapping information comprising thread configuration information that indicates a manner in which at least the communication and the other communication are to be consolidated into the single message thread.

14. The method of claim 13, further comprising:
determining that an expiration time associated with the mapping information has elapsed; and
where obtaining the updated mapping information comprises:
obtaining the updated mapping information based on the expiration time having elapsed.

15. The method of claim 13, further comprising:
providing, for display via another user interface of another application of the device, the second media identifier in association with another communication,
the other communication being associated with another enterprise identifier,
the second media identifier being provided for display based on the updated mapping information, and
the plurality of applications including the application and the other application.

16. The method of claim 13, further comprising:
receiving the communication;
mapping the enterprise identifier to the second media identifier based on the updated mapping information; and
where providing, for display via the user interface of the application of the device, the second media identifier in association with the communication comprises:
providing, for display via the user interface of the application of the device, the second media identifier in association with the communication based on mapping the enterprise identifier to the second media identifier.

17. The method of claim 13, where the plurality of applications are associated with a plurality of communication techniques.

18. The device of claim 1, where the thread configuration information includes at least one of:
information that identifies each enterprise identifier for which corresponding enterprise messages are to be consolidated into the single message thread, or
information that identifies a set of common values associated with enterprise identifiers for which corresponding enterprise messages are to be consolidated into the single message thread.

19. The non-transitory computer-readable medium of claim 7, where the thread configuration information includes at least one of:
information that identifies each enterprise identifier for which corresponding enterprise messages are to be consolidated into the single message thread, or
information that identifies a set of common values associated with enterprise identifiers for which corresponding enterprise messages are to be consolidated into the single message thread.

20. The method of claim 13, where the thread configuration information includes at least one of:
information that identifies each enterprise identifier for which corresponding enterprise messages are to be consolidated into the single message thread, or
information that identifies a set of common values associated with enterprise identifiers for which corresponding enterprise messages are to be consolidated into the single message thread.

\* \* \* \* \*